Figure 1:
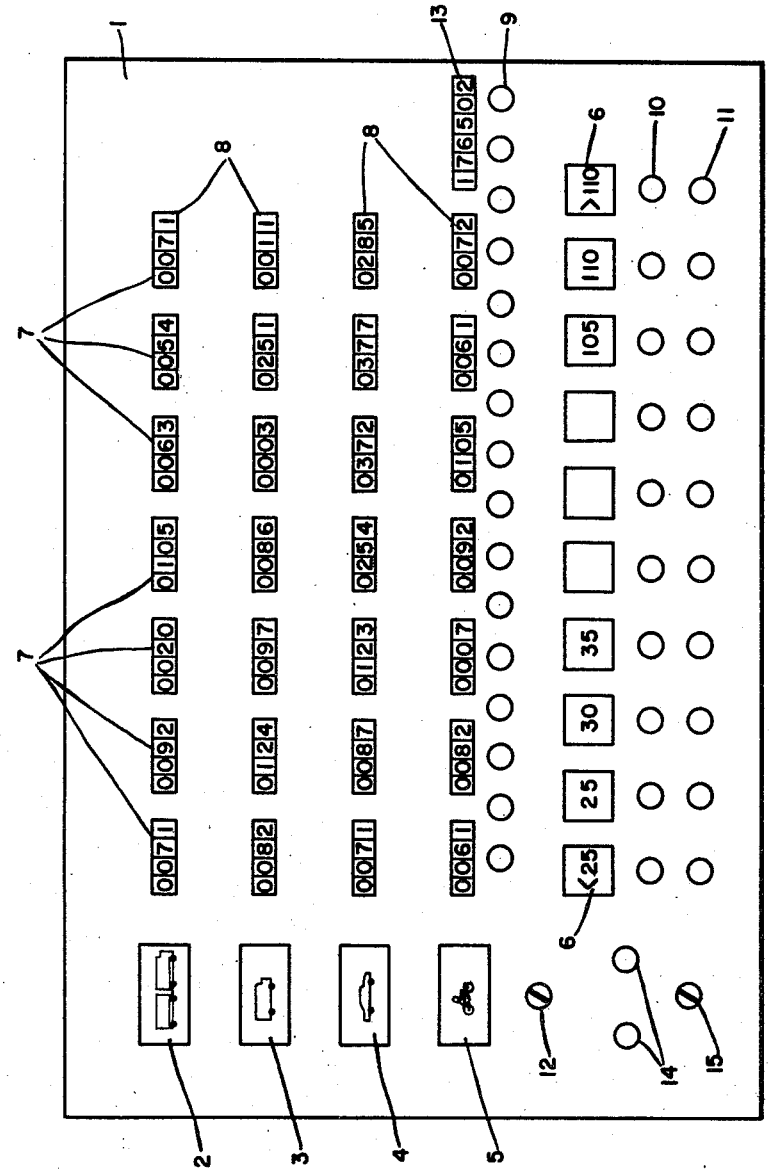

FIG. I.

April 27, 1965 H. K. RUPPERSBERG ET AL 3,181,150
INDICATING DEVICE
Filed Nov. 25, 1960 3 Sheets-Sheet 2

INVENTORS
Hans Klaus Ruppersberg
& Wolf Schallehn
BY George H. Spencer
ATTORNEY

INVENTORS
Hans Klaus Ruppersberg
& Wolf Schallehn
BY George H Spencer
ATTORNEY

United States Patent Office

3,181,150
Patented Apr. 27, 1965

3,181,150
INDICATING DEVICE
Hans Klaus Ruppersberg and Wolf Schallehn, Ulm (Danube), Germany, assignors to Telefunken Aktiengesellschaft, Berlin, Germany
Filed Nov. 25, 1960, Ser. No. 71,558
Claims priority, application Germany, Nov. 25, 1959, T 17,520
33 Claims. (Cl. 343—8)

The present invention relates to a system for indicating the type of vehicle moving past a given point, as well as the speed of such vehicle, by means of Doppler frequencies which occur when electromagnetic waves are reflected from moving targets.

There exists a system for measuring the speed of road vehicles wherein reed-type frequency meters are used for indicating a Doppler frequency which is proportional to the vehicle speed, which frequency-responsive reeds are equipped with leaf-spring contacts that energize corresponding indicators. A continuous indication can be obtained by using additional relays, which continuous indication is cancelled when a new target is picked up by the system.

The above-described system can be modified in such a manner that the length of the vehicle, and consequently the vehicle type, can be identified and indicated. In such an arrangement, each of the tongues, which is fashioned as a switch, has associated with it a capacitor whose capacitance is inversely proportional to the mechanical natural frequency of the particular tongue. As long as a vehicle is within the lobe or field of radiation of the antenna, one of the capacitors, depending on the operative position of the switching device associated with the switching relays, will be charged by way of an ohmic resistance. A measuring instrument, which is connected in parallel with the capacitors, indicates the voltage and thus the length of the vehicle. This instrument, if desired, can be calibrated directly in units of length.

The disadvantage of the above-described system is that the vehicle length is indicated on a dial which must be read. It is true that the output of the dial can be adapted for automatic registration, but the interpretation or evaluation of the register strip will still require human effort.

It has been found that, for various reasons, mainly the presence of a huge number of individual measurements which must be evaluated, it is necessary to provide automatic measuring and evaluation means. Such automatic means are particularly important in the case of statistical traffic surveys, (1) for purposes of street and traffic planning, especially for accurately evaluating the effect of concentrations of traffic and speed distribution, (2) for traffic control intended to reduce accidents, especially for determining excessive speeds, and (3) for automatically controlling traffic signals as a function of the particular traffic density and the speed of the moving traffic.

According to one known system capable of automatically evaluating the measurements and indications of vehicle length, these lengths are represented by the condition of excitation of relays, which makes it possible to make use of very simple recording means. In this system, capacitors are successively charged by way of ohmic resistances, with each subsequent capacitor being discharged by way of a length indication relay when the voltage across the previously charged capacitor exceeds a predetermined value. The charging is completed upon the termination of the series of Doppler frequencies, and the particular condition of the length indicating relay which prevails at the end will indicate the length of the vehicle and consequently the type of vehicle involved. It has been found, however, that such measurements are not very accurate; furthermore, such measurements are especially sensitive to temperature changes as well as to the age and condition of the instrument.

It is, therefore, an object of the present invention to provide an automatic indicating and evaluating system which overcomes the disadvantages of the prior art, and with this object in view, the present invention resides mainly in a system for determining and indicating the vehicle type and speed by means of the Doppler frequency which occurs in an electromagnetic reflection measuring arrangement, which system incorporates means for counting the number of times the Doppler frequency train passes through zero within a time interval which is a function of the speed of the vehicle.

When a reflecting surface approaches a distance of $\lambda/2$ the antenna of a radar Doppler apparatus, the Doppler frequency will vary by one period, and if a rod of a length $a$ having reflecting portions on the surface passes through an antenna diagram having a width $b$, under a mean angle $\alpha$ relative to the horizontal, then there will arise a series of Doppler frequency oscillations which pass through zero approximately $$\frac{2(a+b) \cos \alpha}{\lambda}$$

times. From this, it will be seen that if the width $b$, the wave length and the angle $\alpha$ are known, the rod length $a$ can be determined from the number of times the Doppler frequency train passes through zero, i.e., the number of times the amplitude of the frequency train has the magnitude 0.

Figure 2:
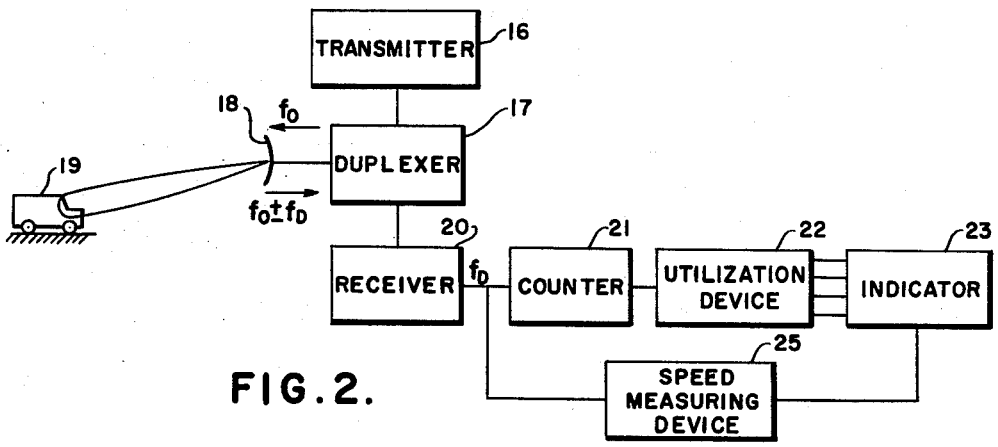

According to the above principle, it is possible to determine the length $a$ of a vehicle travelling through the radiation field of an antenna which is directed towards the vehicle from above, for example with the apparatus, shown in FIG. 2.

Figure 3:
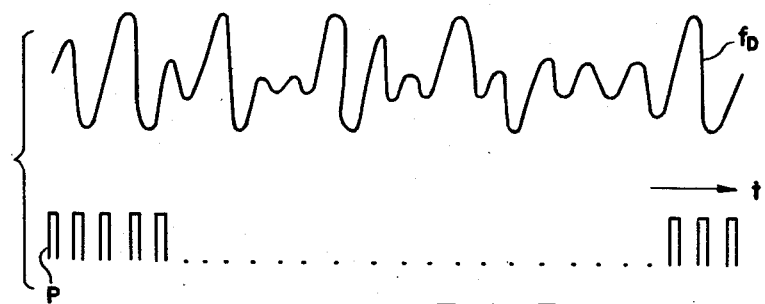
Figure 4:
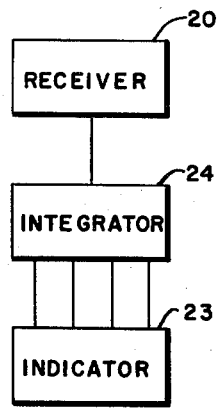

In FIG. 2 a frequency $f_0$ of the transmitter 16 is transmitted via the duplexer 17 and the antenna 18 towards the vehicle 19, from which because of the radial velocity of the vehicle the frequency $f_0 \pm f_D$ is reflected and received via the antenna 18 and the duplexer 17 by the receiver 20. The output signal of the receiver 20 has the Doppler frequency $f_D$ which after amplification and amplitude limitation is fed to the counter 21. Assuming the vehicle has a certain constant speed resulting in a certain Doppler frequency, the time for which this Doppler frequency can be measured is proportional to the length of the vehicle. In FIG. 3 there is shown a diagram of the Doppler frequency $f_D$ which is not yet amplitude limited as a function of time $t$. Whenever the amplitude of the Doppler frequency train passes through zero a pulse $p$ is produced in the utilization device 22. These pulses are likewise shown in FIG. 3. Depending on how many pulses are produced in the utilization device 22 a signal is fed via one of the four lines connecting the utilization device 22 with the indicator 23. Each of these connecting lines corresponds to a certain type of vehicle, and therefore the indicator 23 indicates the type of vehicle the corresponding connection line of which passes the signal. In another embodiment of the invention the pulses produced whenever the amplitude of the Doppler frequency train passes through zero are of the same energy contents, for example of the same amplitude and duration. The pulses, each of which thus has the same, given energy contents, are then not counted but their energy is integrated by an integrator 24 (shown in FIG. 4), for example a Miller-type integrator. The integrated signal corresponds to a certain type of vehicle and is indicated by the indicator 23 which is connected with the integrator 24 in the same manner as the indicator 23 with the utilization device 22 via the four connecting lines. This speed of the vehicle is measured with device 25 known per se. The output signal of device 25 is fed to the indicator 23, too.

In an actual measurement, it was found that a vehicle having a length $a$ of about 3 m. passing through an antenna field having an angle $\alpha=30°$, a width $b$ of 2 m., the wave length $\lambda$ being 3 cm., caused the Doppler frequency train to pass through zero about 300 times, i.e., there were 300 periods of the series of Doppler frequency oscillations. Similarly, a truck having a length of about 5 m. produced about 500 passes through zero, and a truck and-trailer having an overall length of about 11 m. produced 800 passes through zero. The thus-calculated number of passages through zero occurs within a certain time interval, the duration of which depends on the speed of the vehicle. Thus, the number of periods of the Doppler frequency train can be determined from the time and speed measurements, which makes it possible to determine the length of the vehicle. It is also possible to determine the lengths of the vehicle by counting the number of times the Doppler frequency train passes through zero. In this case, the periods are counted by an electronic counter which can, for example, be coupled with three relays which, respectively, indicate when the numbers 300, 500 and 800 are exceeded. These relays thus can be used to indicate the following three types of vehicles: passenger vehicles, trucks and truck-and-trailer. The counting means and the electronic counting circuits per se are known.

A further counting method is based on the following: upon the occurrence of each passage through zero, an impulse of the same energy content is produced and the thus-obtained impulses are integrated, for example, in a Miller-type integrator. The amplitude of the output of this integrator is then directly proportional to the number of times the Doppler frequency train goes through zero, and from this the vehicle lengths for the abovementioned three types of vehicles can be determined, with the lengths of these vehicle types being of a ratio of approximately 3:5:8.

Figure 5:
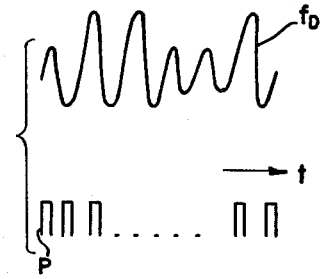
Figure 6:
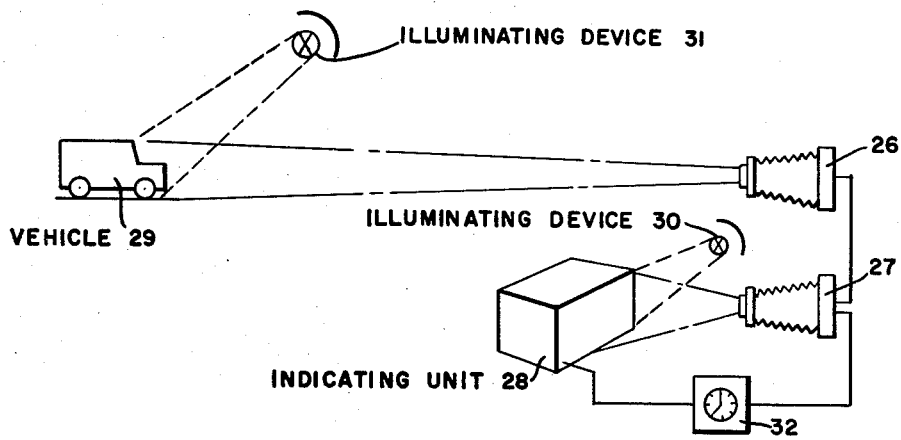

FIG. 5 is analogous to FIG. 3. The Doppler frequency $f_D$ is the same as that shown in FIG. 3 but the duration of the train of pulses $p$ is shorter than in FIG. 3 because of the smaller length of the vehicle measured.

Additional objects and advantages of the present invention will become apparent upon consideration of the following description when taken in conjunction with the accompanying drawings, in which the figures show particularly advantageous arrangements of the indicating and utilizing apparatus for measuring the vehicle lengths and speeds, which arrangements operate according to the above-described principles, with the vehicle lengths being used as an indication of the vehicle type.

In FIG. 1 an indicating board 1 has a tabular arrangement of vertical columns and horizontal lines containing indicating signs, of which sign 2 represents truck-and-trailer combinations hereinafter referred to as vehicle type A, sign 3 represents trucks, hereinafter referred to as vehicle type B, sign 4 represents passenger cars, hereinafter referred to as vehicle type C, and sign 5 represents motorcycles, hereinafter referred to as vehicle type D. These signs contain an appropriate literary legend, or its abbreviation, of the particular vehicle type, or it may be a pictorial representation, such as the silhouette of the particular vehicle type. Line 6 contains signs for the vehicles speeds, which increase numerically from left to right and are broken down into appropriate individual sub-ranges. For example, the signs can represent speeds within 5 km./h. (kilometers per hour) intervals in an overall speed range of 25 km./h. to 110 km./h. (or about 15 to 70 m.p.h.). It is, of course, possible to use other ranges, but the given overall range is generally the one which is of the greatest interest insofar as road traffic is concerned. For speeds below 25 km./h. and above 110 km./h., it is desirable to use special signs which indicate the speed in numerical values.

Columns 7 and lines 8 represent the output of counters, such as digital or decade counters of known construction, for indicating the number of vehicles of the various types and moving at the various speeds. These counters are, for example, in the form of electromechanical indicators in which the values are flipped from one to the next, or in the form of electronic counting tubes, and they are so arranged as to be in the same line as the vehicle type with which they are associated. Furthermore, each counter counts the number of the particular vehicles of the type corresponding to the particular line 8, which moves at the particular speed corresponding to the particular column 7. Normally, traffic moving slower than, for example, 25 km./h. or faster than 110 km./h. is of no particular interest for the purpose of traffic analysis; for analyzing city traffic, speeds near 50 km./h. (about 30 m.p.h.) and for analyzing highway traffic, speeds near 80 km./h. (about 50 m.p.h.) are of special importance inasmuch as these speeds are generally of the order of the legal speed limits. In order to reduce the requisite number of counters, it is possible to switch to counters, the number of which is less than the number of speed ranges to be encompassed, by way of switches or switching devices with connecting strings which are arranged in the lines 9, 10 and 11. Thus, thanks to the two-dimensional arrangement of the counters on the indicating board, it is possible to observe visually the speed distribution and traffic density with respect to the speeds, inasmuch as the counters are arranged so as to give, from left to right, a summation of the number of vehicles of each particular type which travel, during a given time interval, at given speeds.

Inasmuch as, for purposes of traffic analysis, the frequency of motorcycle traffic is of relative little importance, a switch 12 is provided for switching the counters assigned to vehicle type D so that these switches will indicate the sum total of the other vehicle types within a given speed range, i.e., the counter normally assigned to count vehicles of type D travelling in the 30 km./h. range, can be switched so as to indicate the total number of vehicles of types A, B and C travelling in this 30 km./h. range. A further counter 13 indicates the total sum of all vehicles counted by the system.

The board can be re-set to zero by means of a switch 15 or by remotely actuated switching devices 14 which are connected in parallel with switch 15. According to one particular advantageous embodiment of the present invention, lamps are arranged behind the windows in the line 6 as well as behind the windows of the signs 2, 3, 4 and 5, so that when the speed and type of a particular vehicle is being indicated, the associated lamps will light up, thereby giving an especially good general observation and control of the individual measurements. For facilitating the reading of the counters, the columns and/or lines can be contrastingly color-coded. Furthermore, the arrangement may be connected with a photographic apparatus which, after the speed and vehicle type is visible on the board, is triggered so as to take a picture of the board, or pictures of both the board and of the vehicle whose speed and type is being indicated on the board. This may be especially useful when the photographic apparatus is activated upon the exceeding of a posted speed limit so that permanent documentary proof is available. This photographic apparatus can be equipped with a flash unit or other means of artificial illumination.

It is also possible to connect the arrangement with automatic electronic computing apparatus, of known construction, for controlling the traffic, such as through the actuation of traffic signals, as a function of the traffic density, vehicle types, and the speeds of the vehicles of each type. It is possible, for statistical purposes, to read and register the counters photographically, together with subsequent automatic resetting, if desired. The indicating and evaluation arrangement can, of course, also be used in conjunction with vehicle type and speed-measuring indicating apparatus which operate according to principles different from the one discussed above.

The present invention may be used in conjunction with the apparatus disclosed in application, Serial No. 767,180, filed October 14, 1958, now Patent No. 3,072,901, particular reference being made to FIGURES 1, 2, 3, 4a, 4b, 4c, 6, 7 and 8 of said application. According to FIG. 6 a photographic device consisting of two cameras 26 and 27 is used to photograph on the one hand the indication of the apparatus 28 for determining and indicating the type and speed of vehicle according to the invention and on the other hand simultaneously the vehicle 29 observed. Additional illuminating devices such as flash-bulbs 30 and 31 may be used to illuminate the objects photographed. Furthermore, it is possible only to use one camera 27 to photograph the indication of the unit 28 regularly for statistical purposes. The counters 7, 8 and 13 may be reset to zero by means of the control device incorporating the clock 32 which is connected with the switching device 14.

Figure 7:
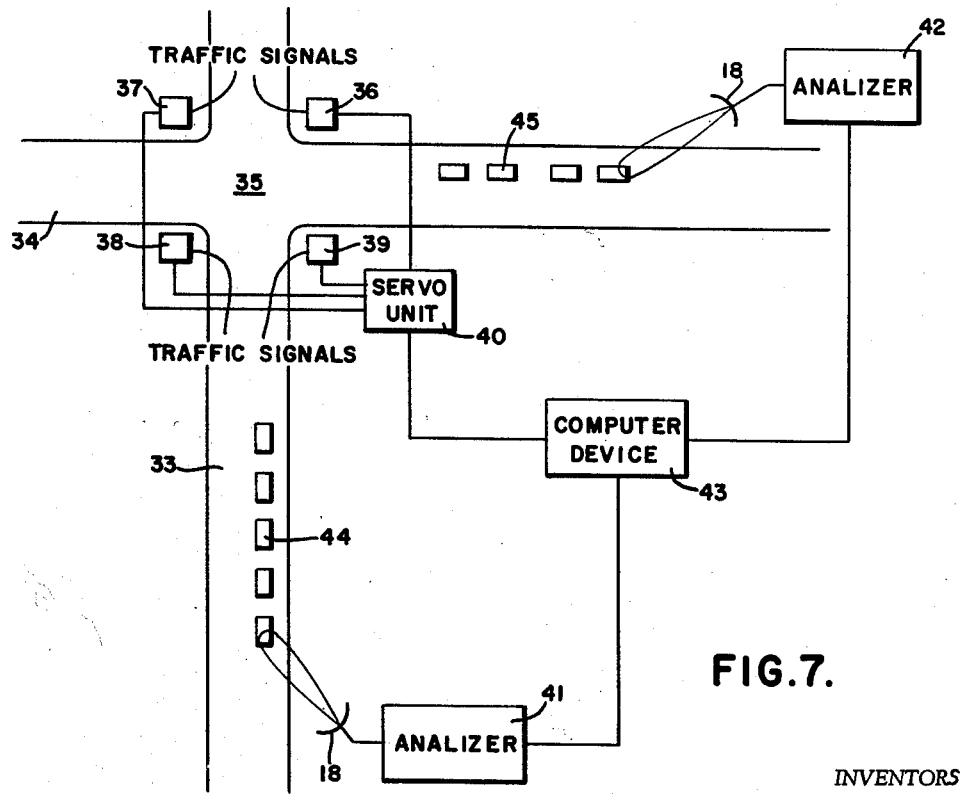

FIG. 7 shows two roads 33 and 34 with their crossing point 35. Traffic signals 36, 37, 38 and 39 are connected with a servo unit 40 by means of which red or green lights are switched on and off in the traffic signals. The traffic on the roads 33 and 34 is analyzed by means of the apparatus 41 and 42 according to the invention. These apparatus determine the traffic density, the type and the speed of the vehicles 44 and 45 on the roads. As the distances of the units 41 and 42 to the crossing point 35 are known the computing device 43 is able to calculate the time of arrival of the vehicles at the crossing point. Simultaneously the computing device 43 considers the number of vehicles arriving and their type. Hereby it is possible to block or to open the traffic at the crossing point by means of the traffic signals in such a manner that traffic-jam is avoided in the best possible way.

It will be understood that the above description of the present invention is susceptible to various modifications, changes and adaptations, and the same are intended to be comprehended within the meaning and range of equivalents of the appended claims.

We claim:

1. Apparatus for determining and indicating the type and speed of vehicles, comprising, in combination: emitting and receiving means for emitting electromagnetic waves and for receiving waves reflected by the vehicles; counting means for counting the number of times which the Doppler frequency train, which occurs when waves are reflected from a moving vehicle, passes through zero during a predetermined time interval which is a function of the speed of the vehicle, said counting means being set for predetermined values coresponding, respectively, to numbers of passages through zero which themselves correspond to given vehicle types; and an indicating board for indicating the vehicle type and speed thereof.

2. Apparatus according to claim 1 wherein said counting means comprise electronic counters.

3. Apparatus according to claim 2 wherein said electronic counters are digital counters.

4. Apparatus according to claim 2 wherein said electronic counters are decade counters.

5. Apparatus according to claim 2 wherein said indicating board incorporates relays which are actuated by a corresponding one of said electronic counters.

6. Apparatus according to claim 1, further comprising means for generating, when the Doppler frequency train passes through zero, an impulse of a given energy content; and integrating means for integrating said impulses.

7. Apparatus according to claim 6 wherein said integrating means are in the form of a Miller integrator.

8. Apparatus according to claim 1 wherein the vehicle type and the speed of the vehicle are indicated simultaneously.

9. Apparatus according to claim 1 wherein the vehicle type and the speed of the vehicle are indicated closely one after the other.

10. Apparatus according to claim 1 wherein said counting means comprise counters for counting the total number of vehicles within a predetermined time interval.

11. Apparatus according to claim 1 wherein said counting means comprise individual counters each counting different vehicle types.

12. Apparatus according to claim 1 wherein said counting means comprise individual counters at least one of which counts vehicles of more than one type.

13. Apparatus according to claim 1 wherein said indicating board includes means connected to said counting means for indicating the number of vehicles travelling at speeds within a plurality of speed sub-ranges within an overall speed range.

14. Apparatus according to claim 13 wherein said indicating boards includes further means connected to said counting means for indicating the number of vehicles travelling at speed outside of said overall speed range.

15. Apparatus according to claim 1 wherein said indicating board comprises a plurality of indicating means each having a lamp which is energized upon actuation of the corresponding indicating means.

16. Apparatus according to claim 1 wherein said indicating board comprises a plurality of indicators each corresponding to a particular vehicle type.

17. Apparatus according to claim 16 wherein each indicator carries a literary legend indicative of the particular vehicle type.

18. Apparatus according to claim 16 wherein each indicator carries a pictorial legend indicative of the particular vehicle type.

19. Apparatus according to claim 16 wherein said indicators are color-coded.

20. Apparatus according to claim 16, further comprising means for resetting said indicating and counting means.

21. Apparatus according to claim 16, further comprising means for making a permanent pictorial record of said indicating board.

22. Apparatus according to claim 21 wherein said last-mentioned means comprise a photographic apparatus and artificial lighting means therefor.

23. Apparatus according to claim 16, further comprising means for photographing both said indicating board and the vehicle whose speed and type are recorded on said board.

24. Apparatus according to claim 2, further comprising means for resetting said counters to zero.

25. Apparatus according to claim 24, further comprising means for periodically actuating said resetting means.

26. Apparatus according to claim 2, further comprising an indicating board for indicating the vehicle type and the speed thereof; photographic means for making a permanent pictorial record of the indicating board at any given instant; and means for resetting said counters to zero, said resetting means being effective after said photographic means have made a permanent pictorial record of said indicating board.

27. Apparatus according to claim 1, further comprising means which evaluate the output of said counters for controlling traffic signals in response to vehicular traffic conditions.

28. Apparatus according to claim 27 wherein said evaluating means comprise computing means.

29. Apparatus according to claim 27 wherein said evaluating means comprise servo means for the traffic signals.

30. Apparatus according to claim 28 wherein the computing means calculate the time of arrival of the vehicles at the traffic signals.

31. Apparatus according to claim 30 wherein the computing means consider the type of vehicle arriving at the traffic signals if two or more directions of traffic are to be controlled.

32. Apparatus according to claim 31 wherein the computing means actuate the traffic signals in a predetermined way so as to open a traffic direction for a preferred type of vehicle simultaneously arriving with another type of vehicle in the other direction of traffic.

33. Apparatus according to claim 13 wherein the number of said speed sub-ranges is greater than the number of counting means for said sub-ranges, including switching means for selectively connecting the counting means to several of the means of said sub-ranges.

References Cited by the Examiner
UNITED STATES PATENTS

| | | | |
|---|---|---|---|
| 2,785,395 | 3/57 | Platzman | 343—8 |
| 2,878,467 | 3/59 | Barker | 343—8 |
| 2,954,462 | 9/60 | Utt | 343—9 |
| 3,059,232 | 10/62 | Barker | 343—8 |

CHESTER L. JUSTUS, *Primary Examiner.*

FREDERICK M. STRADER, *Examiner.*